United States Patent
Tsue et al.

(10) Patent No.: US 7,327,905 B2
(45) Date of Patent: Feb. 5, 2008

(54) APPARATUS, METHOD, AND PROGRAM FOR EDITING IMAGES

(75) Inventors: Takashi Tsue, Kanagawa-ken (JP); Koichi Yamada, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 598 days.

(21) Appl. No.: 10/998,141

(22) Filed: Nov. 29, 2004

(65) Prior Publication Data

US 2005/0141849 A1 Jun. 30, 2005

(30) Foreign Application Priority Data

Nov. 27, 2003 (JP) .............. 2003-396848
Nov. 25, 2004 (JP) .............. 2004-340465

(51) Int. Cl.
*G06K 9/54* (2006.01)
*G06K 9/60* (2006.01)
*G06F 7/00* (2006.01)
*G06F 12/00* (2006.01)

(52) U.S. Cl. .............. 382/305; 382/306; 707/2; 707/7; 707/6; 707/104.1; 707/200

(58) Field of Classification Search .............. 382/103, 382/170, 175, 180, 216, 284, 305, 306; 345/838, 345/433; 348/231.2; 358/1.18, 335, 452, 358/537; 707/2, 6, 7, 104.1, 200
See application file for complete search history.

(56) References Cited

U.S. PATENT DOCUMENTS

| 5,561,796 | A | * | 10/1996 | Sakamoto et al. | .............. 707/3 |
| 6,865,297 | B2 | * | 3/2005 | Loui et al. | .................. 382/224 |
| 7,148,990 | B2 | * | 12/2006 | Atkins et al. | .............. 358/1.18 |
| 2003/0069893 | A1 | * | 4/2003 | Kanai et al. | ............. 707/104.1 |

FOREIGN PATENT DOCUMENTS

JP 9-214868 A 8/1997
JP 2003-182260 A 7/2003

* cited by examiner

*Primary Examiner*—Brian Le
(74) *Attorney, Agent, or Firm*—Sughrue Mion, PLLC

(57) ABSTRACT

When a photo album is generated of an event such as wedding, images to be inserted in image insertion areas in a template can be selected easily. A professional photographer photographs the bride and groom on the day of wedding, and obtains image data sets. An editing screen has a catalog display field and a template display field. The image data sets are classified into scenes in the event, and correspondence information representing correspondence between the scenes in the event, the classified image data sets, and pages in the template is generated with reference to a table relating the scenes to the pages. A catalog of the image data sets classified into the scene corresponding to a specified one of the pages is displayed in the editing screen with reference to the correspondence information.

10 Claims, 9 Drawing Sheets

| EVENT NAMES | PROPORTION(%) |
|---|---|
| WEDDING 1 | A=20, B=30, C=7, D=20, E=13, F=10 |
| WEDDING 2 | A=10, B=30, C=10, D=20, E=30 |
| . . . | . . . |

| EVENT NAMES | PROPORTION(%) |
|---|---|
| WEDDING 1 | A=20, B=30, C=7, D=20, E=13, F=10 |
| WEDDING 2 | A=10, B=30, C=10, D=20, E=30 |
| ⋮ | ⋮ |

| WEDDING 1 | | | | | | | PS1 |
|---|---|---|---|---|---|---|---|
| TEMPLATES | A | B | C | D | E | F | |
| T1 | 1,2 | 3,4,5 | 5 | 6,7 | 8 | 9 | |
| T2 | 1 | 2,3 | 4 | 5 | 6 | 7 | |
| ⋮ | | | ⋮ | | | | |

| BEFORE CHANGE | | AFTER CHANGE |
|---|---|---|
| S1-1 | → | S1-1' |
| S1-2 | → | S1-2' |
| . | | . |
| . | | . |
| . | | . |
| S1-7 | → | S1-7' |
| S1-8 | → | S1-8' |
| S2-1 | → | S1-9' |
| S2-2 | → | S1-10' |
| S2-3 | → | S2-1' |
| S2-4 | → | S2-2' |
| . | | . |
| . | | . |
| . | | . |
| S2-10 | → | S2-8' |
| S2-11 | → | S2-9' |
| S2-12 | → | S2-10' |
| S3-1 | → | S2-11' |
| S3-2 | → | S3-1' |
| S3-3 | → | S3-2' |
| . | | . |
| . | | . |
| . | | . |
| S3-8 | → | S3-7' |

APPARATUS, METHOD, AND PROGRAM FOR EDITING IMAGES

BACKGROUND OF THE INVENTION

1. Field of the Invention

The present invention relates to an image editing apparatus and an image editing method for selecting an image to be inserted in an image insertion area in a template. The present invention also relates to a program for causing a computer to execute the image editing method.

2. Description of the Related Art

As has been described in Japanese Unexamined Patent Publication No. 9(1997)-214868, a method has been proposed for generating a photo album by reading images from a film with a film scanner and by printing an image including a selected part of the images arranged in desired layout.

In addition, another method has also been proposed in Japanese Unexamined Patent Publication No. 2003-182260 for generating a photo album by printing desired images as photographs and by inserting the photographs in photo mounting corners formed on photo album paper according to a size of the photographs and layout of the photo album.

Meanwhile, in order to generate a photo album of a wedding, a professional photographer sometimes photographs the bride and groom as well as attendants in front of a church as a venue for the wedding or in front of a monument during the wedding. Images obtained in this manner are used to generate a photo album, and the photo album tells a story that can be enjoyed later, since the album traces the behavior of the bride and groom on their wedding day.

In order to generate a photo album, a professional photographer or an operator at a DPE store that provides a photo album generation service (hereinafter collectively referred to as an operator) stores images obtained by photography in an image server, and displays on display means such as a monitor of a workstation a catalog of the images stored in the image server and a template having an image insertion area used for photo album generation. The operator then selects one of the images to be inserted in the image insertion area from the catalog. At this time, the operator carries out image editing processing, such as processing to change image quality (blurring or sharpness enhancement, for example), processing to reshape the image (such as rotation, resizing, and trimming), and processing to restore the image (such as red-eye correction and scar removal) on the selected image, so that the image inserted in the image insertion area will be attractive.

A photo album is generated by printing images edited in the above manner and pasting the images on photo album paper. A photo album can also be generated by printing composite images having a layout of the photo album, generated from edited images inserted in image insertion areas of a template, as has been described in Japanese Unexamined Patent Publication No. 9(1997)-214868.

In the case where a photo album is generated in the above manner, hundreds of images are obtained by photography at an event such as a wedding. However, an operator is heavily burdened with selection of an image to be inserted in an image insertion area in a template from a catalog including the hundreds of images.

SUMMARY OF THE INVENTION

The present invention has been conceived based on consideration of the above circumstances. An object of the present invention is therefore to enable easy selection of an image to be inserted in an image insertion area in a template for generating a photo album, especially of an event such as a wedding.

An image editing apparatus of the present invention comprises:

display means for displaying various kinds of information;

event table storage means for storing an event table relating event names representing events, each comprising a plurality of scenes, to a proportion of the number of images comprising each of the scenes in each of the events represented by the event names;

page-scene table storage means for storing a page-scene table relating each of the scenes in each of the events to a page number in each of corresponding templates, comprising a plurality of pages including at least one image insertion area in which an image or images are inserted;

input means for receiving input of information representing predetermined one of the events, images on the predetermined event, one of the templates used for generation of a photo album, and information on the template;

image classification means for classifying the images in chronological order into the respective scenes according to the proportion of the number of images in each of the scenes in the predetermined event, with reference to the event table;

correspondence information generation means for generating correspondence information representing correspondence between the scenes in the predetermined event, the classified images, and the pages in the template used for generation of the photo album, by referring to the page-scene table;

page selection means for receiving selection of a desired one of the pages in the template used for generation of the photo album;

template display control means for displaying on the display means the page whose selection has been received;

image display control means for displaying on the display means a catalog of the images classified into the scene corresponding to the selected page, by generating the catalog of the images with reference to the correspondence information; and image selection means for receiving selection of the image or images to be inserted in the image insertion area or areas from the catalog.

The page-scene table is prepared for each of the events.

The image editing apparatus of the present invention may further comprise relation information storage means for storing relation information relating to each other the information on the predetermined event, the information on the template used for generation of the photo album, and information on the image or images selected for insertion in the image insertion area or areas in each of the pages in the template.

Further, in the image editing apparatus according to the present invention, the image display control means may be a means for generating a catalog of the images so that a predetermined number of images, in time series, which are immediately before and/or after the images, classified into the scene corresponding to the selected page, is included.

Further, in this case, a means for receiving change in the division position for classification in the catalog of the images, displayed on the display means, is further provided.

The image classification means may be a means for reclassifying the plurality of images according to the received division position and a proportion of the number of pixels in the plurality of scenes.

Furthermore, the image editing apparatus of the present invention may comprise guide image display means for displaying in the image insertion area or areas, in the template displayed on the display means, a guide image or guide images for guiding the image or images to be inserted therein.

In addition, the image editing apparatus of the present invention may also comprise editing means for editing the image or images inserted in the image insertion area or areas.

In the image editing apparatus of the present invention, the editing means carries out at least one of processing for changing a quality of the image or images, processing for reshaping the image or images, and processing for restoring the image or images on the image or images.

An image editing method of the present invention comprises the steps of:

receiving input of information representing a predetermined one of events, images on the predetermined event, one of templates used for generation of a photo album, and information on the template;

classifying the images with reference to an event table relating event names representing the events, each comprising a plurality of scenes, to a proportion of the number of images comprising each of the scenes in each of the events represented by the event names, into the scenes in the predetermined event in chronological order according to the proportion of the number of images in each of the scenes;

generating correspondence information with reference to a page-scene table relating each of the scenes in each of the events to a page number in a corresponding one of the templates, comprising a plurality of pages including at least one image insertion area in which an image or images are inserted, for representing correspondence between the scenes in the predetermined event, the classified images, and the pages in the template used for generation of the photo album;

receiving selection of a desired one of the pages in the template used for generation of the photo album;

displaying on display means the page whose selection has been received;

displaying on the display means a catalog of the images classified into the scene corresponding to the selected page by generating the catalog of the images with reference to the correspondence information; and receiving selection of the image or images to be inserted in the image insertion area or areas from the catalog.

The image editing method of the present invention may be provided as a program for causing a computer to execute the image editing method.

According to the present invention, when the information representing the predetermined event, the images on the predetermined event, the template used for photo album generation, and the information on the template are received, the images are chronologically classified into the scenes according to the proportion of the number of images in each of the scenes in the predetermined event with reference to the event table. Furthermore, the correspondence information is generated for representing correspondence between the scenes in the predetermined event, the classified images, and the pages in the template used for photo album generation, with reference to the page-scene table. When the selection of the desired one of the pages in the template used for photo album generation is received, the page is displayed on the display means. With reference to the correspondence information, the catalog of the images classified into the scene corresponding to the page is generated and displayed on the display means. Therefore, an operator who carries out an editing operation can display on the display means the catalog of the images corresponding only to the scene to be inserted in the image insertion area or areas in the page, by simply selecting the page in the template. Consequently, the burden on the operator is reduced at the time of selection of the images to be inserted in the image insertion areas in the template.

Furthermore, by storing the relation information that relates to each other the information representing the predetermined event, the information representing the template, and the information representing the image or images selected for insertion in the image insertion area or areas in each of the pages in the template, the editing operation can be easily confirmed later with reference to the relation information.

Further, the catalog of the images is generated so that a predetermined number of images, in time series, which are immediately before and/or after the images, classified into the scene, is included. Accordingly, even if the number of photographs taken at each scene is different according to the conditions of the photography place, the difference in photographers, or the like, images, classified into the scene corresponding to the selected page, can be displayed. Therefore, an image, which will be inserted in an image insertion area of the template, is selected efficiently.

DESCRIPTION OF THE PREFERRED EMBODIMENT

Figure 1:
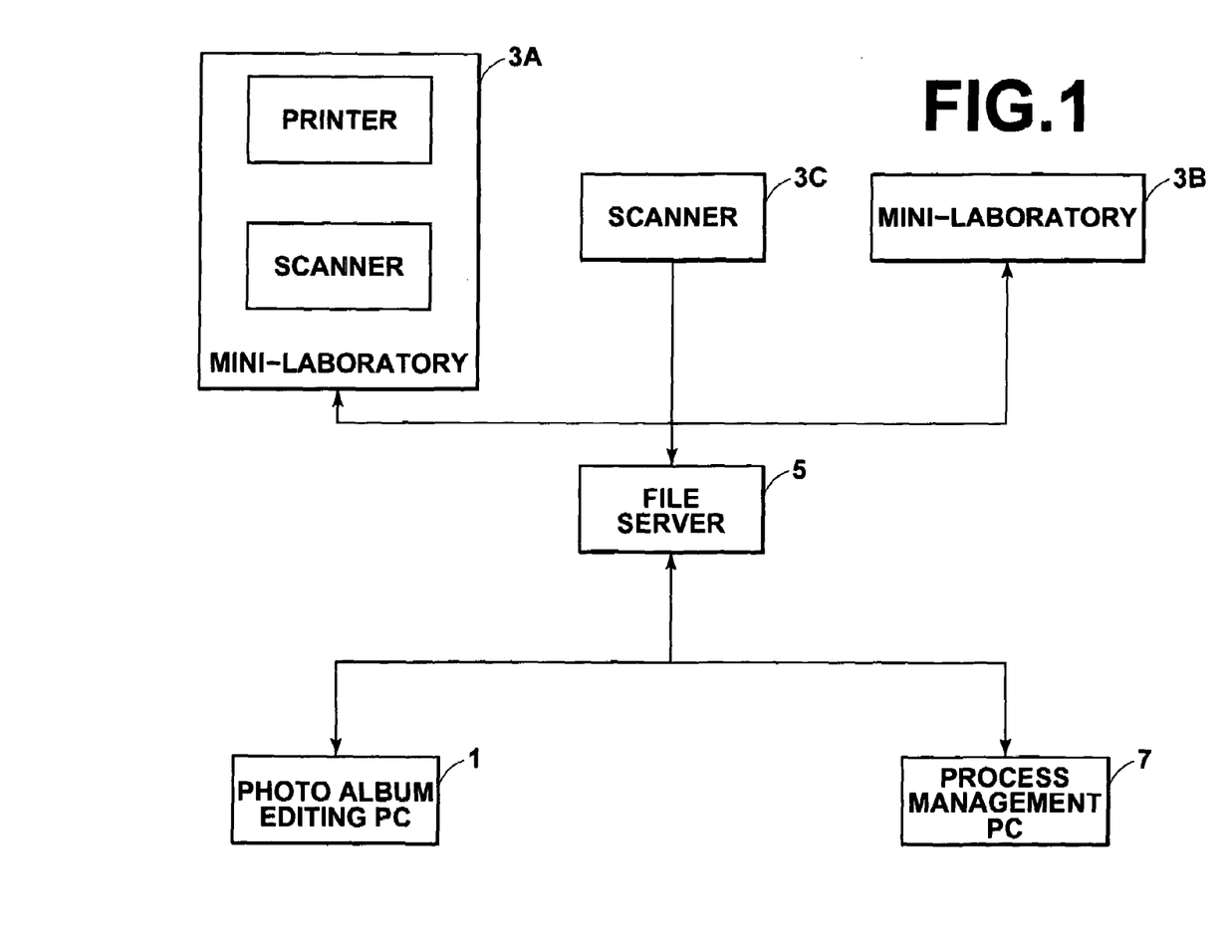
FIG. 1 is a block diagram showing the configuration of an image editing system comprising an image editing apparatus of an embodiment of the present invention.

Hereinafter, an embodiment of the present invention will be described with reference to the accompanying drawings. FIG. 1 is a block diagram showing the configuration of an image editing system comprising an image editing apparatus of an embodiment of the present invention. As shown in FIG. 1, the image editing system in this embodiment comprises a photo album editing personal computer (hereinafter referred to as the photo album editing PC) 1, a plurality (2, in this case) of mini-laboratories 3A and 3B, a film scanner (hereinafter referred to as a scanner) 3C, a file server 5, and a process management PC 7 connected to each other via a network. The photo album editing PC 1 has functions of the image editing apparatus in the embodiment of the present invention. Each of the mini-laboratories 3A and 3B has a scanner for obtaining image data sets representing images recorded on a developed film by reading the images from the film, and a printer for printing the image data sets. The file server 5 has a large-capacity hard disc for storing the image data sets. The process management PC 7 manages processes of photo album generation.

In this embodiment, the case of a wedding as an event will be described. In the wedding, a professional photographer photographs the bride and groom who requested generation of a photo album (hereinafter referred to as a user) on the day of their wedding, and the photographer generates a photo album telling a story of the event by using the images. However, the event is not necessarily limited to a wedding.

Figure 2:
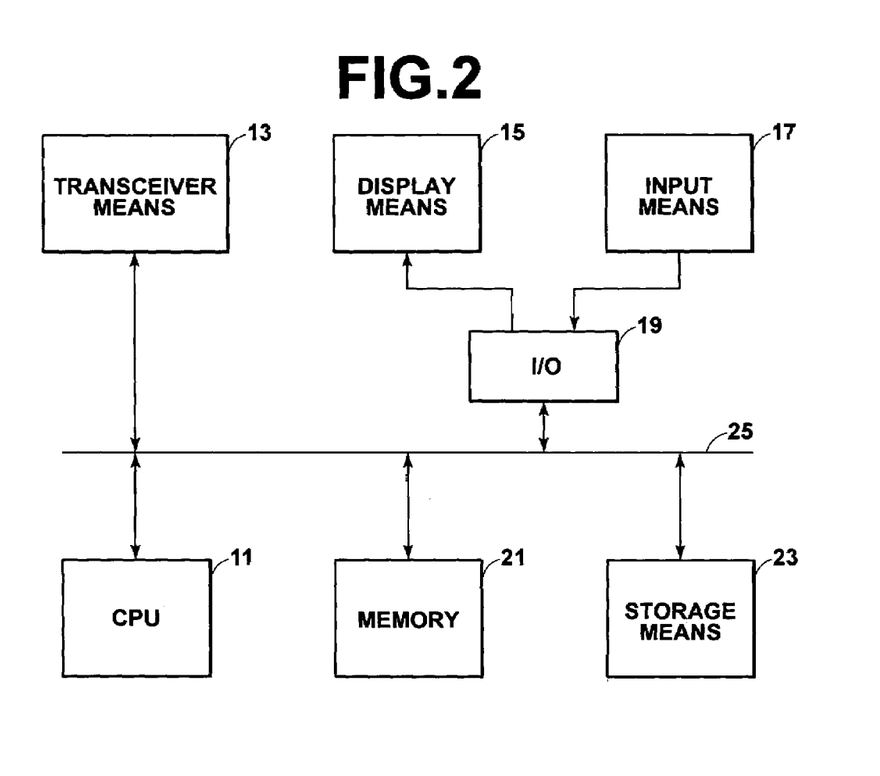
FIG. 2 is a block diagram showing the configuration of a photo album editing PC.

FIG. 2 is a block diagram showing the configuration of the photo album editing PC 1. As shown in FIG. 2, the photo album editing PC 1 comprises a CPU 11 (acting as the image classification means, the correspondence information generation means, the image display control means, and the template display control means), transceiver means 13 (acting as the input means) for networking, display means 15, an I/O 19, a memory 21, and storage means 23 (acting as the event table storage means, the page-scene table storage means, and the relation information storage means). The CPU 11 controls the photo album editing PC 1. The transceiver means 13 sends and receives various kinds of information, including the image data sets, to and from the file server 5. The display means 15 displays various kinds of information such as the images and a template. The I/O 19 reads various kinds of information input by an operator of the photo album editing PC 1 via input means 17 (acting as the page selection means and the image selection means) for delivering the information to the CPU 11. The I/O 19 also outputs a display instruction to the display means 15 according to an instruction from the CPU 11. The memory 21 comprises a ROM storing a program for operating the CPU 11 and various constants, and a RAM used by the CPU 11 as a workspace. The storage means 23 comprises a hard disc for storing various kinds of information such as the image data sets.

A bus 25 connects the CPU 11 in the photo album editing PC 1 to peripheral circuits including the transceiver means 13, the I/O 19, the memory 21, and the storage means 23. In this manner, the CPU 11 can control the peripheral circuits. More specifically, the CPU 11 controls the transceiver means 13, the display means 15, the memory 21, and the storage means 23 to receive information such as the image data sets and template data sets, which will be described later, from the file server 5, to store the image data sets in the storage means 23, and to display a catalog and the template on the display means 15 in order to select a part of the images for insertion in an image insertion area or image insertion areas (hereinafter referred to as the image insertion areas) of the template, to generate image editing information, and to transmit the image editing information to the file server 5 in response to an instruction input from the input means 17 by the operator.

The photo album editing PC 1 receives photo album editing information comprising a user ID and information on the template specified by the user who requested generation of the photo album when the operator carries out a photo album editing operation. The photo album editing PC 1 also receives information on the event, of which the user has requested generation of the photo album. The photo album editing PC 1 sends the photo album editing information to the file server 5, and receives one of the template data sets, the image data sets, and guide image data sets to be inserted in the image insertion areas in the template, from the file server 5.

The photo album editing PC 1 then reduces the image data sets to generate the catalog of the images represented by the image data sets, and inserts guide images represented by the guide image data sets in the image insertion areas of the template represented by the template data set. In this manner, the photo album editing PC 1 displays an editing screen including the catalog and the template having the guide images inserted therein on the display means 15. Hereinafter, how the editing screen is displayed will be described.

In this embodiment, the user requests generation of the photo album of a wedding as the event from a DPE store that runs the image editing system. A plurality of templates are available for weddings, and the user selects a desired one of the templates as the template used for generation of the photo album. A plurality of scenes are included in a wedding, such as behavior of the bride and groom before the wedding, photography with relatives, a wedding ceremony, cutting a wedding cake, during and ending of reception, and departure to a honeymoon. In each of the scenes, the compositions of photographed images are almost fixed. Therefore, the compositions of the images inserted in the image insertion areas in the template are also fixed.

Figure 3:
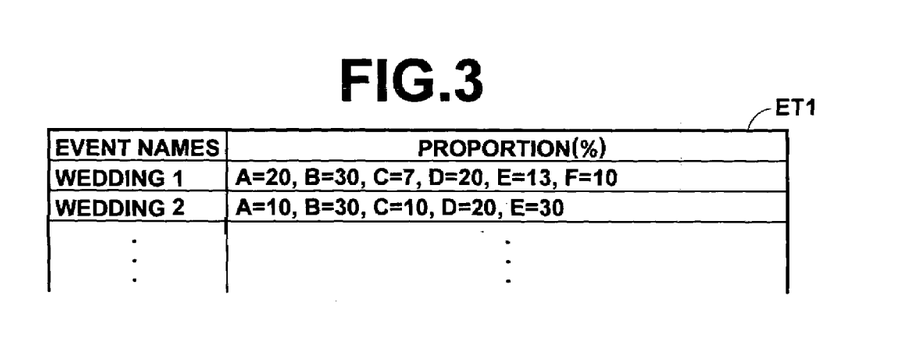
FIG. 3 shows an example of an event table.

In this embodiment, an event table is stored in the storage means 23, relating names of events, each comprising a plurality of scenes, to a proportion of the number of images in each of the scenes in each of the events represented by the event names. FIG. 3 shows an example of the event table. As shown in FIG. 3, an event table ET1 relates the event names such as Wedding 1 and Wedding 2 to the proportion (percentage) of the number of images comprising each of the scenes such as A, B, C, D, and E in each of the events represented by the event names. For example, the event Wedding 1 has 6 scenes named A through F, and the proportion in the number of images in the respective scenes is 20:30:7:20:13:10. The order of occurrence of the scenes in the corresponding event agrees with the alphabetical order of the scenes. In other words, the alphabet represents the chronological order of the scenes.

Figure 4:
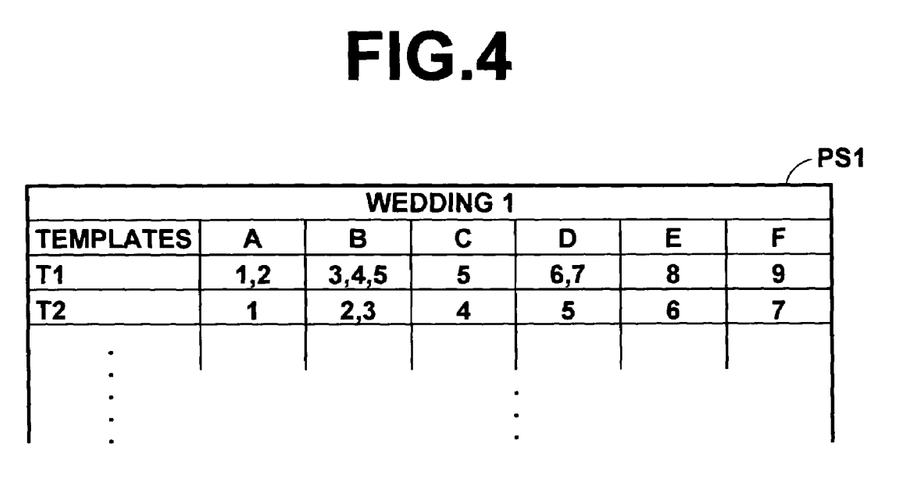
FIG. 4 shows an example of a page-scene table.

Each of the templates used for photo album generation has a plurality of pages. The storage means 23 stores a page-scene table relating a page number in each of the templates to each of the scenes in the respective events. FIG. 4 shows an example of the page-scene table. As shown in FIG. 4, a page-scene table PS1 relates the page number in each of the templates, such as T1 and T2, to the scenes in the corresponding event, such as Wedding 1. By referring to the template T1 shown in the page-scene table PS1 shown in FIG. 4, correspondence of the pages 1 and 2 in the template T1 to the scene A is understood. Likewise, the pages 3 to 5 in the template T1 correspond to the scene B while the page 5 also corresponds to the scene C. The pages 6 and 7 correspond to the scene D while the pages 8 and 9 respectively correspond to the scenes E and F. The page 5 corresponds to the scenes B and C, which represents that the page 5 in the template T1 needs to be filled with images whose composition corresponds to the scenes B and C.

In the description below, the user is assumed to have requested generation of the photo album of the event Wedding 1, and to have specified the template T1 as the template used therefor. The number of the image data sets photographed at the event is 300.

The photo album editing PC 1 receives the template data set and the image data sets from the file server 5, and classifies the image data sets into the scenes by referring to the event table ET1 according to the information representing the event, of which the user has requested generation of the photo album, and the template used therefor. Assume that file names of the image data sets are DSCF001.jpg through DSCF0300.jpg, and the order of the file names agrees with the order of photography. The event Wedding 1 has the 6 scenes from A to F, and the proportion of the number of images in each of the scenes is 20:30:7:30:13:10. Therefore, the image data sets from DSCF0001.jpg to DSCF0060.jpg are chronologically classified into the scene A while the image data sets from DSCF0061.jpg to DSCF0150.jpg are chronologically classified into the scene B. The image data sets from DSCF0151.jpg to DSCF0171.jpg are classified chronologically into the scene C while the image data sets from DSCF0172.jpg to DSCF0231 are chronologically classified into the scene D. The image data sets from DSCF0232.jpg to DSCF0270.jpg are chronologically classified into the scene E while the image data sets DSCF0271.jpg to DSCF00300.jpg are classified chronologically into the scene F. This result of classification may be stored as a list in the storage means 23 or recorded in tag information of each of the image data sets.

The photo album editing PC 1 generates correspondence information representing correspondence between the scenes in the event, the classified image data sets, and the pages in the template T1 specified by the user for generation of the photo album, by referring to the page-scene table PS1.

Figure 5:
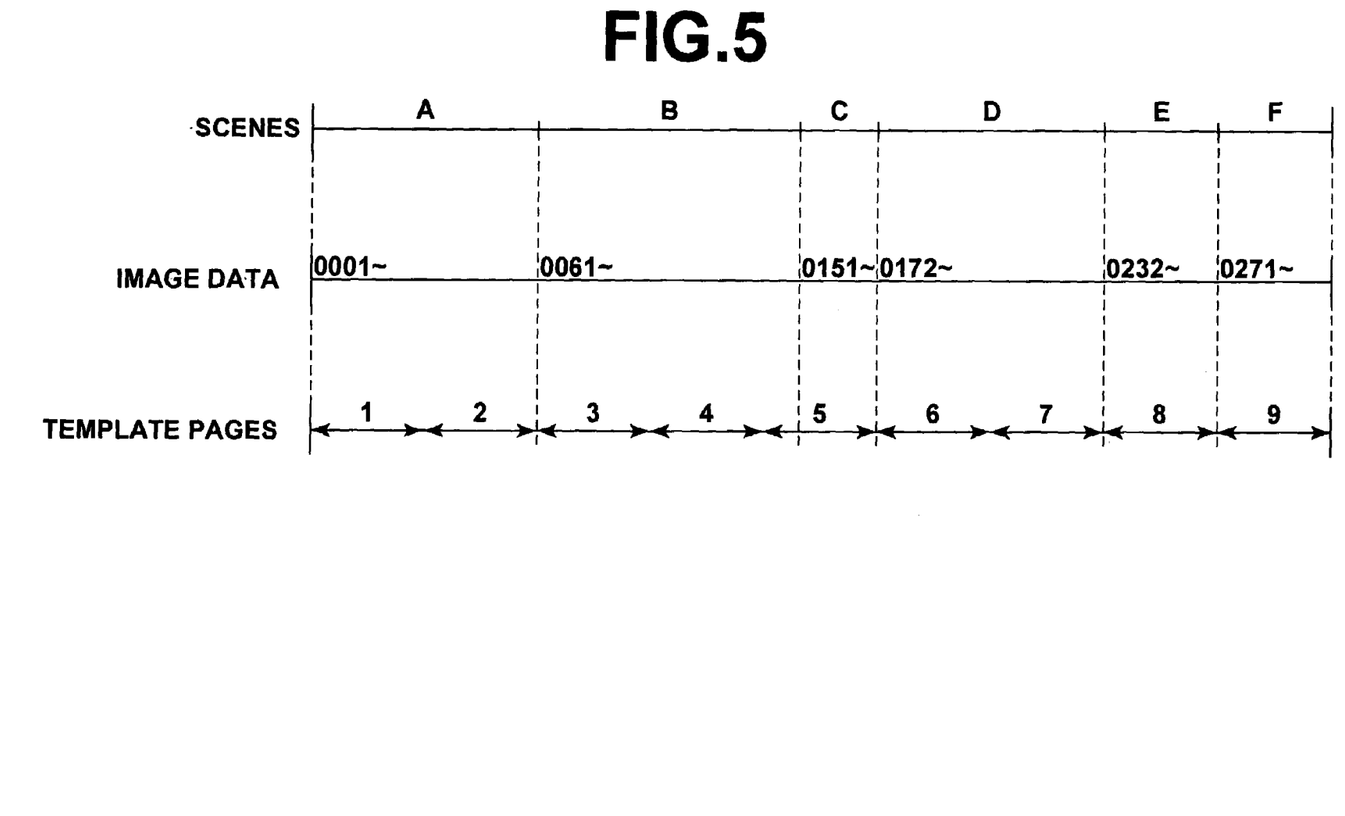
FIG. 5 shows an example of correspondence information.

FIG. 5 shows an example of the correspondence information. As shown in FIG. 5, which of the image data sets classified into which of the scenes corresponds to which of the pages in the template can be understood with reference to the correspondence information. In FIG. 5, the image data sets are represented by the numbers included in the file names thereof.

Figure 6:
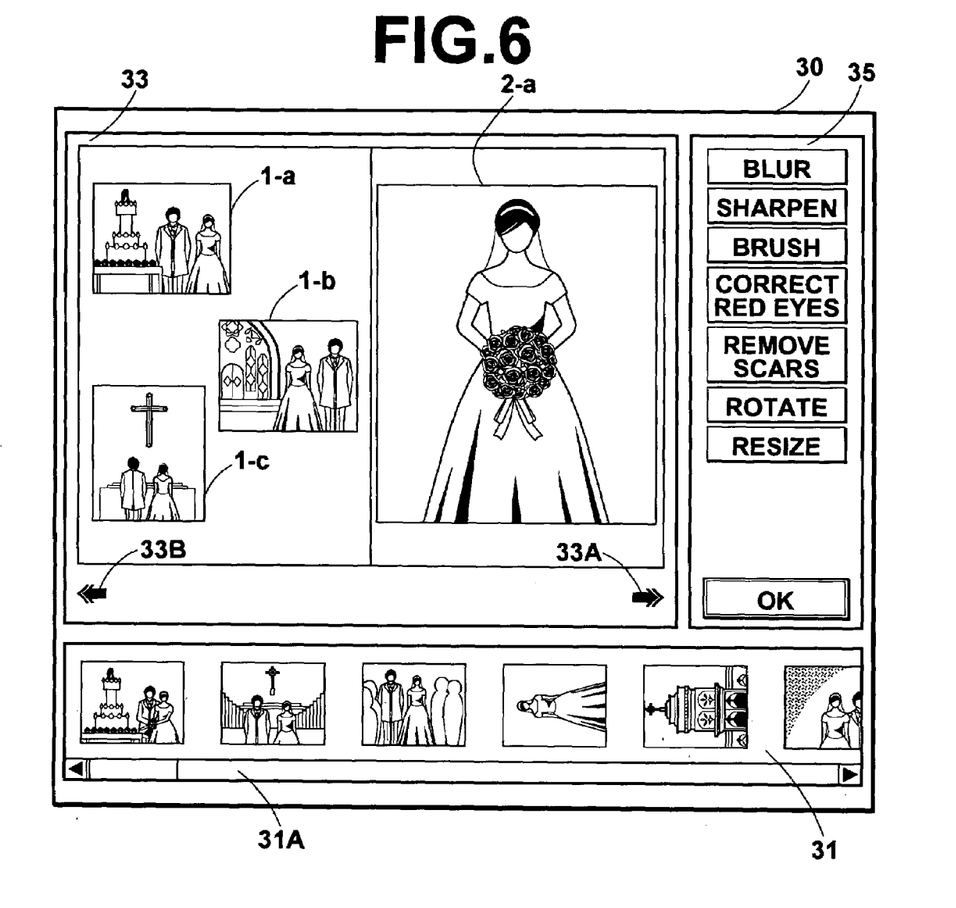
FIG. 6 shows an example of an editing screen in an initial state thereof.

FIG. 6 shows an example of the editing screen in an initial state. As shown in FIG. 6, an editing screen 30 includes a catalog display field 31 in which the catalog is displayed, a template display field 33 in which the template having the guide images inserted therein is displayed, and a tool box 35. In the initial screen, the pages 1 and 2 in the template T1 are displayed.

In the catalog display field 31 is shown the catalog of the image data sets classified only into the scene or scenes corresponding to the pages shown in the template display field 33. For example, since the pages 1 and 2 of the template T1 are displayed in the initial screen, the photo album editing PC 1 generates the catalog of the image data sets DSCF0001.jpg to DSCF0060.jpg corresponding to the scene A in Wedding 1, and displays the catalog in the catalog display field 31 of the editing screen 30. A scroll bar 31A is displayed in the catalog display field 31, and the images that cannot be displayed in one screen can be displayed by moving the scroll bar 31A to the right or left.

In the template display field 33 are displayed arrow buttons 33A and 33B for changing a page of the template being displayed in the template display field 33 in the case where the template has a plurality of pages. The operator can change the pages of the template to be displayed in the editing screen 30 by clicking the arrow button 33A or 33B.

When the operator changes the pages of the template to be displayed in the editing screen 30, the photo album editing PC 1 generates the catalog of the image data sets classified into the scene or scenes corresponding to the new pages and displays the catalog in the catalog display field 31. For example, when the operator changes the pages to 3 and 4, the photo album editing PC 1 generates the catalog of the image data sets DSCF0061.jpg to DSCF0150.jpg corresponding to the scene B of Wedding 1, and displays the catalog.

In the tool box 35 are displayed buttons for carrying out image quality changing processing such as blurring, sharpening, and brushing, buttons for carrying out image restoration processing such as red-eye correction and scar removal, and buttons for carrying out image reshaping processing such as rotation and resizing, and an OK button for ending the processing.

In the example shown in FIG. 6, the template in the template display field 33 has 4 image insertion areas 1-a, 1-b, 1-c, and 2-a, all of which are filled with the guide images.

The guide images notify the operator who carries out the photo album editing operation of what composition the respective images should have in the corresponding image insertion areas in the template. In the case of photography for generating photo albums of events, the photography is carried out at the same place and in the same situation regardless of who a user as a requester is. For example, in the case of photography of brides and grooms in weddings, photography is carried out at a predetermined place in a hotel and in a predetermined situation such as exchange of marriage rings and cutting a wedding cake.

Therefore, by using the same composition for the images to be inserted in the image insertion areas in the template for all users who selected the same template, the quality of photo albums generated in the above manner can be consistent. Consequently, the guide images can be illustrations representing the composition to be inserted in the image insertion areas, drawings, or sample images obtained by photography of a model in the same place or in the same situation, for example. In this embodiment, sample images generated by photographing a model are inserted in the image insertion areas 1-a, 1-b, 1-c, and 2-a.

The operator carries out the photo album editing operation by inputting photo album editing instructions while using the editing screen 30. More specifically, the operator selects one of the images having the same composition as the guide image inserted in one of the image insertion areas from the catalog while changing the pages in the template and the catalog of the images, and drags and drops the selected image by using the input means 17. In this manner, the operator inserts the selected image in the corresponding image insertion area. After the insertion, the operator can select the image insertion area to edit the selected image inserted therein by clicking any one of the buttons in the tool box 35. For example, by clicking the button for rotation, the operator can rotate the image by 90 degrees in the clockwise direction. By clicking the button for resizing, the operator can change a size of the image. Furthermore, by clicking the button for blurring or sharpening or brushing, the quality of the image can be changed. By clicking the button for red-eye correction or scar removal, the image can be restored.

After selecting all the images to be inserted in the respective image insertion areas and editing all the selected images, the operator clicks the OK button to end the photo album editing operation using the template. In response to clicking the OK button, the photo album editing PC 1 generates the image editing information including the file names of the selected images, information relating the file names of the images to be inserted in the respective image insertion areas and the corresponding image insertion areas, information on the processing to be carried out on the image data sets such as blurring, reduction or enlargement, and red-eye correction, information on an area to be trimmed in the case of trimming, and information on a magnification ratio in the case of reduction or enlargement. The image editing information is sent to the file server 5.

At the same time, the photo album editing PC 1 records the information representing the event, the information representing the template specified by the user, the information on the file names of the image data sets selected for insertion in the image insertion areas in the template, as relation information in the storage means 23.

The file server 5 stores the image data sets obtained by reading the images recorded on the developed film by using the scanner 3C or the mini-laboratory 3A or 3B. The image data sets are recorded in a folder for the user who requested generation of the photo album. The file server 5 also stores the template data sets representing the templates to be used for photo album generation, as well as the guide image data sets to be inserted in the image insertion areas in the templates.

The file server 5 refers to the photo album editing information sent from the photo album editing PC 1, and sends the template data set representing the template selected by the user, the image data sets stored in the folder corresponding to the user ID, and the guide image data sets representing the guide images to be inserted in the image insertion areas in the selected template to the photo album editing PC 1.

When the image editing information is received from the photo album editing PC 1, the file server 5 refers to the file names of the image data sets representing the selected images included in the image editing information, and carries out preparatory processing and editing processing on the selected image data sets for generating processed image data sets. The preparatory processing includes at least one of brightness correction processing, color correction processing and gradation correction processing on the selected image data sets. The editing processing includes the processing specified by the image editing information. More specifically, the editing processing includes the processing for changing image quality such as blurring, sharpening, and brushing, the image reshaping processing such as trimming and enlargement/reduction processing, and the image restoration processing such as red-eye correction and scar removal on the image data sets specified by the image editing information.

Figure 7:
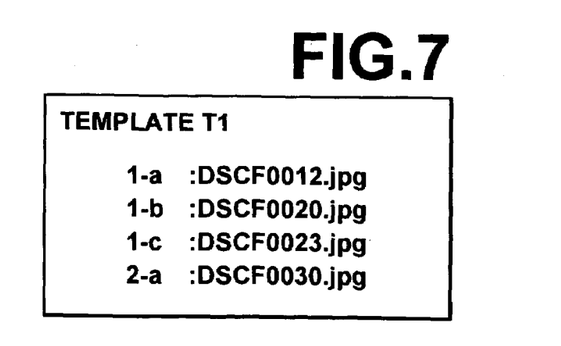
FIG. 7 shows an example of layout information.

The file server 5 generates layout information from the information relating the file names of the image data sets and the image insertion areas of the template included in the image editing information. FIG. 7 shows an example of the layout information. As shown in FIG. 7, the layout information relates the names of the image data sets (DSCF0012.jpg, DSCF0020.jpg, DSCF0023.jpg, and DSCF0030.jpg) and the corresponding image insertion areas 1-a, 1-b, 1-c, and 2-a in the template T1. The file server 5 sends the processed image data sets and the layout information to either the mini-laboratory 3A or 3B.

The process management PC 7 receives information representing completion of the processes such as the photo album editing operation, printing, and photo album inspection input by the operator, in order to manage the processes regarding photo album generation. In the case where the photo album has passed the inspection carried out by the operator for examining the quality of the generated photo album, the process management PC receives information thereon, and finishes the process management for the photo album. In the case where the photo album did not pass the inspection, the process management PC 7 receives an instruction to generate the photo album again.

Figure 8:
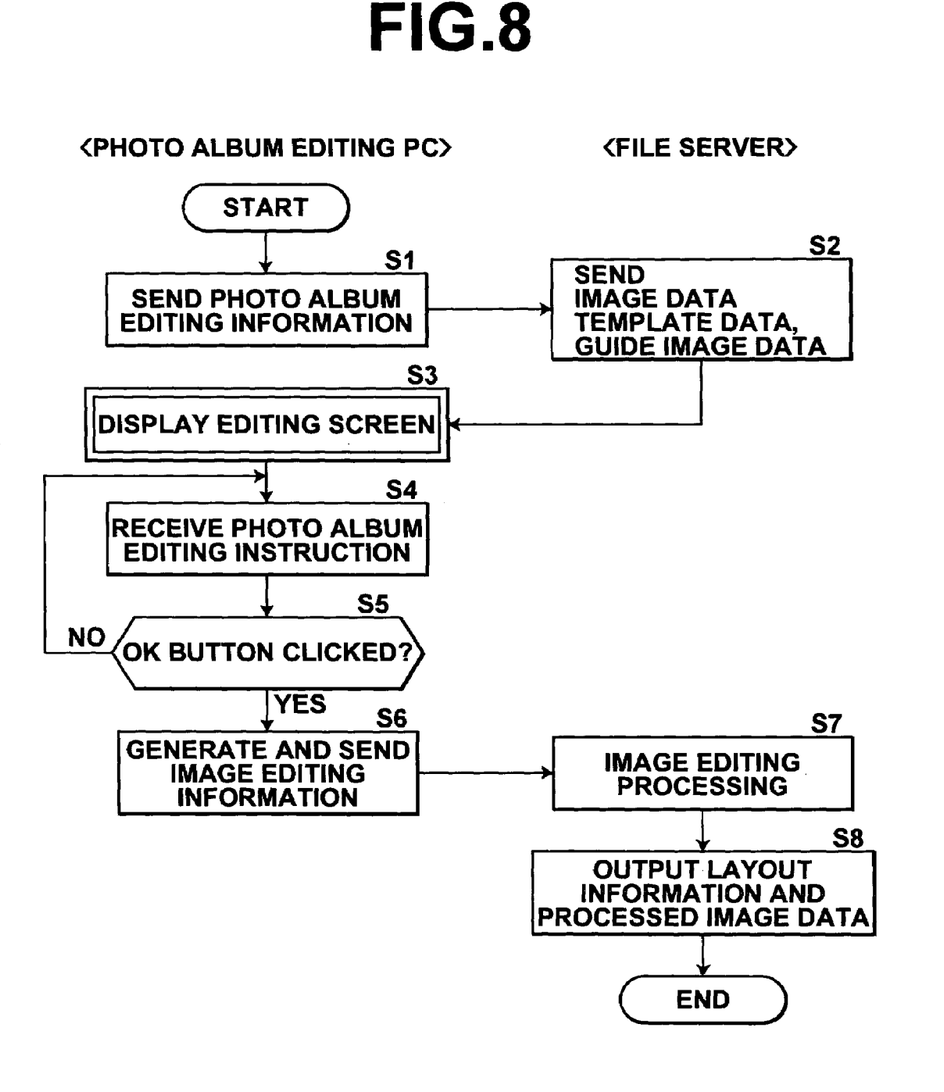
FIG. 8 is a flow chart showing a procedure carried out in this embodiment.

A procedure carried out in this embodiment will be described next. FIG. 8 is a flow chart showing the procedure. The file server 5 has already stored the image data sets obtained by reading the images from the developed film recorded with photographs on the wedding of the user.

The procedure starts when the operator inputs an instruction to edit the photo album from the photo album editing PC 1. The photo album editing PC 1 sends the photo album editing information including the user ID and the information on the template selected by the user to the file server 5 (Step S1).

The file server 5 receives the photo album editing information, and sends the image data sets stored in the folder corresponding to the user ID, the template data set representing the template selected by the user, and the guide image data sets representing the guide images to be inserted in the image insertion areas in the template to the photo album editing PC 1 (Step S2).

The photo album editing PC 1 receives the image data sets, the template data set, and the guide image data sets, and displays the editing screen 30 on the display means 15 (Step S3).

Figure 9:
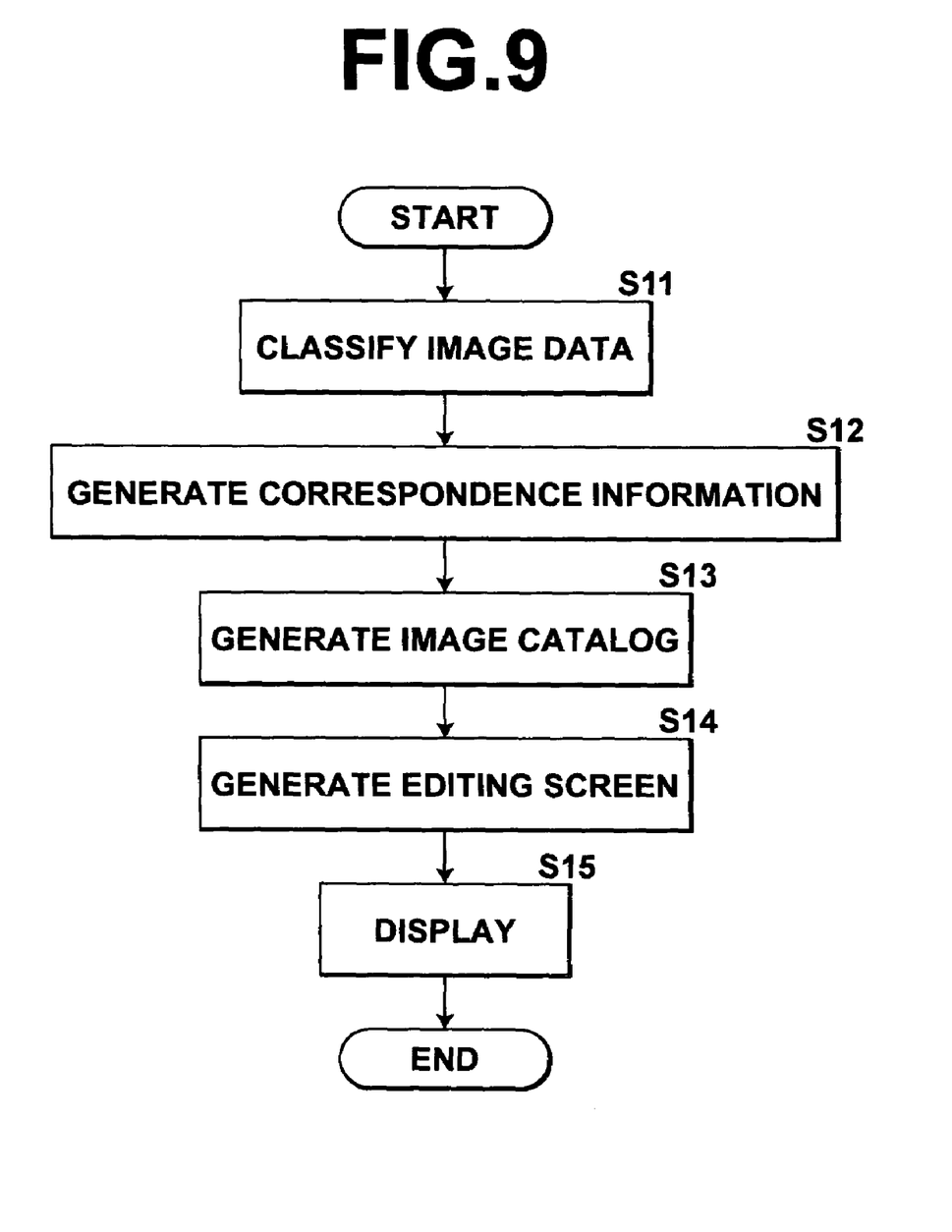
FIG. 9 is a flow chart showing a procedure carries out at the time of display of the editing screen.

FIG. 9 is a flow chart showing a procedure for displaying the editing screen 30. The photo album editing PC 1 classifies the image data sets into the scenes with reference to the event table ET1 (Step S11). The photo album editing PC 1 then generates the correspondence information representing the correspondence between the scenes of the event, the classified image data sets and the pages in the template specified by the user for generation of the photo album, by referring to the page-scene table PS1 (Step S12). The photo album editing PC 1 displays the pages 1 and 2 in the template display field 33 as the initial screen by referring to the correspondence information, and generates the catalog of the image data sets classified into the scene corresponding to the pages 1 and 2 (Step S13). The photo album editing PC 1 generates the editing screen 30 including the catalog in the catalog display field 31 (Step S14), and displays the editing screen 30 (Step S15) to end the procedure.

The guide images represented by the guide image data sets are inserted in the image insertion areas in the template displayed in the template display field 33 in the editing screen 30.

The photo album editing PC 1 receives the photo album editing instructions, input by the operator viewing the editing screen 30 (Step S4 in FIG. 8). When the operator changes the pages of the template displayed in the editing screen 30, the photo album editing PC 1 generates the catalog of the image data sets classified into the scene corresponding to the new pages, and displays the catalog in the catalog display field 31.

The photo album editing PC 1 then judges whether or not the OK button has been clicked (Step S5). If a result at Step S5 is affirmative, the photo album editing PC 1 generates the image editing information, and sends the image editing information to the file server 5 (Step S6). If the result at Step S5 is negative, the procedure returns to Step S4 to continue receiving the editing instructions from the operator.

The file server 5 receives the image editing information, and carries out the editing processing by referring to the file names of the selected image data sets included in the image editing information (Step S7). The file server 5 sends the processed image data sets generated through the editing processing and the layout information generated from the image editing information to either the mini-laboratory 3A or 3B (Step S8) to end the procedure.

The mini-laboratory 3A or 3B receives the processed image data sets and the layout information, and prints the processed image data sets to generate prints thereof. The operator (or an operator dedicated to photo album binding) pastes the prints in print insertion areas in photo album paper corresponding to the template while referring to the layout information, and carries out binding and the like to generate the photo album.

The operator in charge of quality control inspects the photo album generated in this manner. In the case where the photo album has passed the inspection, the photo album is sent to the user. In the case where the photo album did not pass the inspection, the instruction is input from the process management PC 7 to generate the photo album again.

As has been described above, in this embodiment, the image data sets are classified into the scenes in the event with reference to the event table ET1, and the correspondence information representing the correspondence between the pages in the template, the scenes in the event, and the classified image data sets is generated with reference to the page-scene table PS1. When the pages to be displayed in the template in the editing screen 30 are changed in the editing screen 30, the catalog of the image data sets classified into the scene corresponding to the new pages is generated with reference to the correspondence information, and displayed in the catalog display field 31. Therefore, by simply selecting a desired one of the pages, the operator can display in the editing screen 30 the catalog of the images corresponding only to the scene to be inserted in the image insertion area or areas in the page. In this manner, the burden on the operator caused by selection of the images to be inserted in the image insertion areas in the template can be reduced.

Furthermore, by storing in the storage means 23 the relation information that relates the information representing the event, the information representing the template specified by the user, and the information representing the file names of the image data sets selected for insertion in the image insertion areas in the template, the editing operation can be easily confirmed later with reference to the relation information.

In the embodiments as described above, the ratio of the numbers of images in each scene is 20:30:7:20:13:10. The image data are chronologically classified into six scenes according to the ratio. However, when the catalog of image data, which has been classified into scenes, is displayed in the catalog display field 31, N (N$\geq$1) sets of image data, which is immediately before and/after the image data, which has been classified into the scene, may be included in the catalog, and displayed in the catalog display field 31.

Figure 10:
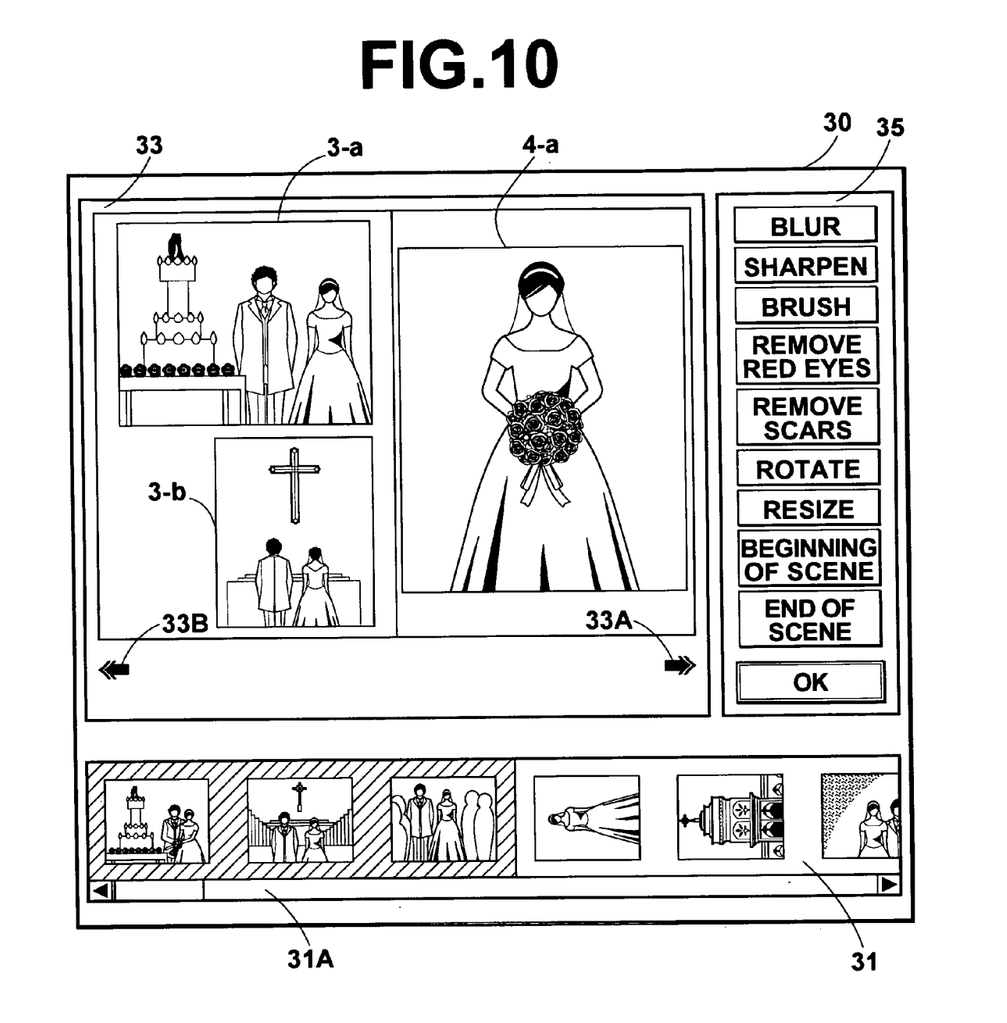
FIG. 10 is a diagram illustrating another example of the editing screen.

For example, in the embodiments as described above, if pages 3 and 4 of the template T1 are displayed, the catalog of the image data with the file names DSCF0061.jpg to DSCF0150.jpg corresponding to the scene B of the wedding is displayed in the catalog display field 31. If N=10, image data with the file names DSCF0051.jpg to DSCF0060.jpg and DSCF0151.jpg to DSCF0160.jpg may be arranged in a chronological order together with the image data with the file names DSCF0061.jpg to DSCF0150.jpg, and displayed in the catalog display field 31. In this case, as illustrated in FIG. 10, images, which are not included in the selected scene, may be displayed by adding a color in the background of each of the images (indicated as a shaded area in FIG. 10) or the like so that they can be distinguished from the images included in the selected scene.

Accordingly, even if the number of photographs taken in each scene differs according to the conditions of photographing places, difference in photographers, or the like, images corresponding to the selected scene may be displayed in the catalog display field 31. Therefore, images, which will be inserted in the image insertion areas of the template, may be efficiently selected.

The number of the sets of image data, which will be included in the catalog together with the image data, which has been classified into the selected scene, may be different between the image data, which is immediately before the classified image data and the image data, which is immediately after the classified image data.

Further, a division position for classifying the scenes may be changed by the instruction of an operator. For example, the operator clicks an image at the beginning of the scene and/or an image at the end of the scene in the catalog display field 31, and clicks a "beginning of scene" button or an "end of scene" button to specify the division position for classification. Accordingly, the photo album editing PC 1 should change the division position for classification.

If the division position is changed as described above, it is preferable that all the image data is reclassified based on the change result.

Figure 11:
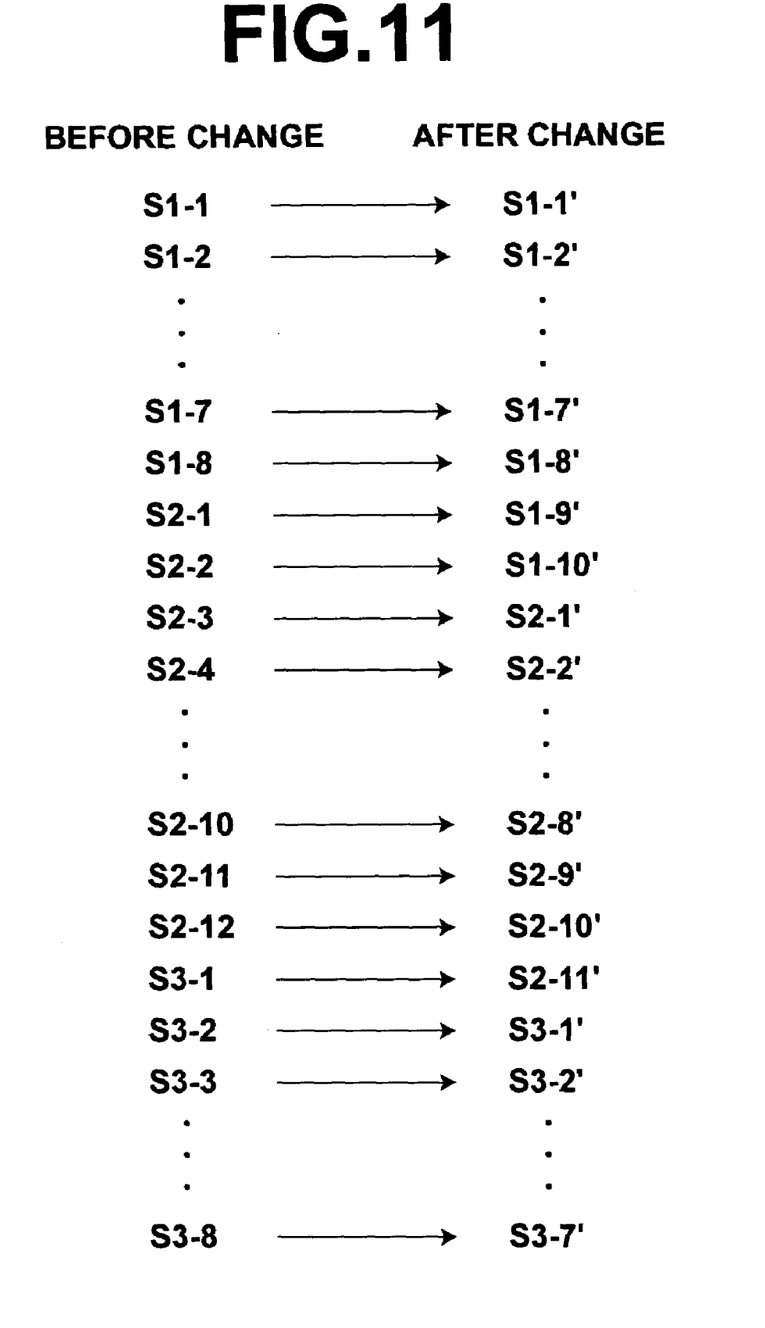
FIG. 11 is a diagram illustrating a corresponding relationship between the images before changing the division position for classification and the images before changing the division position for classification.

For example, for simplifying calculation, it is assumed that there are three scenes of scenes 1 to 3 at a wedding ceremony, and 8, 12, and 3 sets of image data, which are 30 sets in total, are classified into the scenes 1 to 3, respectively. Further, it is assumed that the image data classified into the scene 1 is S1-1 to S1-8, the image data classified into the scene 2 is S2-1 to S2-12, and the image data classified into the scene 3 is S3-1 to S3-8. It is assumed that the operator has specified the image S2-3 in the catalog of the image data of the scene 2 as the image at the beginning of the scene 2.

In this case, since the images S2-1 and S2-2 are included in the scene 1, the number of the images in the scene 1 is 10. These images are images S1-1' to S1-10'. After the photo album editing PC 1 determines the images of the scene 1, it determines the images of the scenes 2 and 3. Here, the ratio of the numbers of the images in the scenes 1 to 3 was 8:12:8, and the total number of images was 28 before changing the division position for classification. Therefore, 10 images, which were newly classified into the scene 1, are excluded, and the remaining 18 images are classified according to the ratio of the numbers of the images of the scenes 2 and 3. Specifically, the number of the images classified into the scene 2 is determined as 11 (S2-1' to S2-11') by using the following expression:

$$18\times(12/(12+8))\approx 11.$$

The number of images classified into the scene 3 is determined as 18−11=7 (S3-1' to S3-7'). The corresponding relationship between the images before changing the division position and the images after changing the division position is illustrated in FIG. 11.

If the image at the end of the scene is specified, all of the images, which are classified into the scenes after the specified scene, should be classified based on the ratio of the number of the images, which was first classified into the scenes after the specified scene.

In the embodiment described above, the processed image data sets of the selected images are printed by the mini-laboratory 3A or 3B, and the operator pastes the prints on the photo album paper corresponding to the template for generating the photo album. However, the file server 5 may generate a composite image data set representing an image (a photo album image) having the images selected by the operator and inserted in the image insertion areas in the template by combining the processed image data sets and the template data set. The composite image data set is output to the mini-laboratory 3A or 3B.

If the mini-laboratory 3A or 3B prints the composite image data set generated in this manner, the photo album can be generated by simply binding the print of the photo album image, without pasting the prints on the paper.

In the above-described embodiment, the photo album is generated by using the image data sets obtained by reading the images recorded on the developed film. However, a photo album can be generated by using image data sets obtained by a digital camera. In this case, the file server 5 comprises a media drive for reading the image data sets from a recording medium such as a memory card storing the image data sets obtained by photography. The image data sets read from the recording medium by the media drive are stored in the file server 5.

In the above-described embodiment, the file server 5 carries out the preparatory processing only on the image data sets selected by the operator of the photo album editing PC 1. However, all the image data sets may be stored in the file server 5 after the preparatory processing carried out thereon at the time of reception of the image data sets from the mini-laboratory 3A or 3B or from the scanner 3C. Furthermore, the photo album editing PC 1 may carry out the preparatory processing on all the image data sets sent from the file server 5 or on the image data sets selected for generation of the photo album.

In the embodiments as described above, the photo album editing PC 1 or the file server 5 may generate, based on layout information, data (album data) including a user image inserted in a template, and the data may be sent to a server or like, which can be accessed by the user, and stored. Accordingly, the user can check whether the photo album will be successfully produced before actual production of the photo album. Further, in this case, the user may select whether the photo album is produced by using the album data or the photo album is reedited.

What is claimed is:

1. An image editing apparatus comprising:
    display means for displaying various kinds of information;
    event table storage means for storing an event table relating event names representing events, each comprising a plurality of scenes, to a proportion of the number of images comprising each of the scenes in each of the events represented by the event names;
    page-scene table storage means for storing a page-scene table relating each of the scenes in each of the events to a page number in each of corresponding templates, comprising a plurality of pages including at least one image insertion area in which an image or images are inserted;
    input means for receiving input of information representing a predetermined one of the events, images on the predetermined event, one of the templates used for generation of a photo album, and information on the template;
    image classification means for classifying the images in chronological order into the respective scenes according to the proportion of the number of images in each of the scenes in the predetermined event, with reference to the event table;
    correspondence information generation means for generating correspondence information representing correspondence between the scenes in the predetermined event, the classified images, and the pages in the template used for generation of the photo album, by referring to the page-scene table;
    page selection means for receiving selection of a desired one of the pages in the template used for generation of the photo album;
    template display control means for displaying on the display means the page whose selection has been received;
    image display control means for displaying on the display means a catalog of the images classified into the scene corresponding to the selected page, by generating the catalog of the images with reference to the correspondence information; and
    image selection means for receiving selection of the image or images to be inserted in the image insertion area or areas from the catalog.

2. The image editing apparatus according to claim 1, further comprising relation information storage means for storing relation information relating to each other the information on the predetermined event, the information on the template used for generation of the photo album, and information on the image or images selected for insertion in the image insertion area or areas in each of the pages in the template.

3. The image editing apparatus according to claim 1, wherein the image display control means is a means for generating a catalog of the images so that a predetermined number of images, in time series, which are immediately before and/or after the images, classified into the scene corresponding to the selected page, is included.

4. The image editing apparatus according to claim 3, further comprising:
    a means for receiving the change in the division position for classification in the catalog of the images, displayed on the display means, wherein the image classification means is a means for reclassifying the plurality of images according to the received division position and a proportion of the number of pixels in the plurality of scenes.

5. The image editing apparatus according to claim 1, wherein the event is a wedding.

6. The image editing apparatus according to claim 1, further comprising guide image display means for displaying in the image insertion area or areas in the template displayed on the display means a guide image or guide images for guiding the image or images to be inserted therein.

7. The image editing apparatus according to claim 1 further comprising editing means for editing the image or images inserted in the image insertion area or areas.

8. The image editing apparatus according to claim 7, wherein the editing means carries out at least one of processing for changing a quality of the image or images, processing for reshaping the image or images, and processing for restoring the image or images on the image or images.

9. An image editing method comprising the steps of:
    receiving input of information representing a predetermined one of events, images on the predetermined event, one of templates used for generation of a photo album, and information on the template;
    classifying the images with reference to an event table relating event names representing the events, each comprising a plurality of scenes, to a proportion of the number of images comprising each of the scenes in each of the events represented by the event names, into the scenes in the predetermined event in chronological order according to the proportion of the number of images in each of the scenes;

generating correspondence information with reference to a page-scene table relating each of the scenes in each of the events to a page number in a corresponding one of the templates, comprising a plurality of pages including at least one image insertion area in which an image or images are inserted, the correspondence information representing correspondence between the scenes in the predetermined event, the classified images, and the pages in the template used for generation of the photo album;

receiving selection of a desired one of the pages in the template used for generation of the photo album;

displaying on display means the page whose selection has been received;

displaying on the display means a catalog of the images classified into the scene corresponding to the selected page by generating the catalog of the images with reference to the correspondence information; and receiving selection of the image or images to be inserted in the image insertion area or areas from the catalog.

10. A computer readable medium stores a program for causing a computer to execute an image editing method comprising the steps of:

receiving input of information representing a predetermined one of events, images on the predetermined event, one of templates used for generation of a photo album, and information on the template;

classifying the images with reference to an event table relating event names representing the events, each comprising a plurality of scenes, to a proportion of the number of images comprising each of the scenes in each of the events represented by the event names, into the scenes in the predetermined event in chronological order according to the proportion of the number of images in each of the scenes;

generating correspondence information with reference to a page-scene table relating each of the scenes in each of the events to a page number in a corresponding one of the templates, comprising a plurality of pages including at least one image insertion area in which an image or images are inserted, the correspondence information representing correspondence between the scenes in the predetermined event, the classified images, and the pages in the template used for generation of the photo album;

receiving selection of a desired one of the pages in the template used for generation of the photo album;

displaying on display means the page whose selection has been received;

displaying on the display means a catalog of the images classified into the scene corresponding to the selected page by generating the catalog of the images with reference to the correspondence information; and receiving selection of the image or images to be inserted in the image insertion area or areas from the catalog.

\* \* \* \* \*